United States Patent [19]

Kranz

[11] 3,770,417

[45] Nov. 6, 1973

[54] SIMULTANEOUS PRODUCTION OF METALLIZED ORES AND COKE

[75] Inventor: Ray E. Kranz, Pittsburgh, Pa.

[73] Assignee: Salem Corporation, Pittsburgh, Pa.

[22] Filed: Feb. 23, 1971

[21] Appl. No.: 118,088

[52] U.S. Cl............................ 75/34, 75/33, 75/36, 201/20
[51] Int. Cl............................................. C21b 13/00
[58] Field of Search............................ 201/20, 3, 27; 75/33, 34, 36

[56] References Cited
UNITED STATES PATENTS

| 2,919,231 | 12/1959 | Donath | 201/20 X |
|---|---|---|---|
| 3,227,627 | 1/1966 | Asquini | 202/103 X |
| 2,824,047 | 2/1958 | Gorin et al. | 201/20 |
| 2,473,987 | 6/1949 | Brandon | 201/20 |
| 1,838,882 | 12/1931 | Trent | 201/20 X |
| 1,829,438 | 10/1931 | Coley | 75/36 X |
| 2,085,625 | 6/1937 | Andersen | 75/36 X |
| 2,146,625 | 2/1939 | Christiansen | 75/36 |
| 2,277,067 | 3/1942 | Brassert | 75/36 X |
| 3,180,725 | 3/1942 | Meyer et al. | 75/36 X |
| 3,185,635 | 5/1965 | Creglow | 201/20 X |
| 3,235,375 | 2/1966 | Meyer et al. | 75/36 X |

FOREIGN PATENTS OR APPLICATIONS

| 288,264 | 11/1928 | Great Britain | 201/24 |

Primary Examiner—Hyland Bizot
Assistant Examiner—M. J. Andrews
Attorney—Frank P. Cyr

[57] ABSTRACT

A process for the production of metallized pellets, sponge iron or other metallized ores simultaneously with the production of a reductant coke and/or char wherein such process is carried on in a substantially airtight devolatilizing chamber having a roof, side walls and a rotary hearth forming the chamber. A carbonaceous material is fed into the devolatilization chamber and the volatiles evolved therefrom are employed for the reduction of the metallic oxides which have also been fed into the devolatilizing chamber with resultant simultaneous production of coke and/or char and metallized pellets, sponge iron or other metallized ores.

11 Claims, No Drawings

3,770,417

SIMULTANEOUS PRODUCTION OF METALLIZED ORES AND COKE

BACKGROUND OF THE INVENTION

Rotary hearth calciners are well known in the art and have been employed with considerable success for the processing of carbonaceous materials therein with a considerable savings in the amount of fuel required to process the said materials. This is due largely to the fact that in the past few years, an apparatus has been devised which is capable of coking carbonaceous materials therein with little, if any, external heat supplied to the rotating hearth to permit the continued processing of materials on the hearth. Essentially, the apparatus for carrying out the process comprises a substantially airtight enclosure having a roof, side walls and including an imperforate rotating or travelling hearth upon which the materials to be processed are deposited. The materials to be processed preferably contain volatiles which evolve therefrom when exposed to heat. Initially, the enclosure or furnace is brought to operating temperature, that is, the temperature within the furnace is such that some of the volatiles in the carbonaceous materials undergoing treatment on the hearth are evolved therefrom and caused to travel upwards within the furnace to a position closely adjacent the roof thereof where air or an air-oxygen mixture is admitted into the furnace, and to there comingle with the evolved volatiles to produce an oxidizing atmosphere in that portion of the furnace while maintaining a reducing atmosphere about the materials undergoing treatment on the hearth. The burning of the volatiles in that portion of the furnace will heat the roof and side walls thereof so that the heat radiated from the roof and side walls and also from the oxidizing volatiles in the upper portion of the furnace will effect a continued removal of volatiles from the materials undergoing treatment on the hearth. As can be appreciated, the continued removal of volatiles from the materials undergoing treatment, as aforesaid, and the continued production of an oxidizing atmosphere in the upper portion of the furnace may provide all of the heat required to properly process the materials undergoing treatment on the hearth and may eventually enable the process to proceed on a fully autogenetic basis. Of course, in instances where the carbonaceous materials undergoing treatment do not release sufficient volatiles to render the process autogenetic, outside heat may be supplied to the upper portion of the furnace by burners mounted in that region of the furnace to supply the additional heat to insure the proper processing of the materials on the hearth. The process defined above contemplates a continuous operation with the carbonaceous materials being continuously introduced onto the rotating or travelling hearth at a point along the same and following the processing thereof in the manner set forth above, the same are continuously removed from thereon and directed to a suitable outlet. In the case of a rotating hearth having a central outlet for the processed materials, roof mounted rabbles may be employed for progressively advancing the materials to the central outlet. These rabbles also serve to stir the materials on the hearth. In instances where no such rabbles are used, suitable scraper means may be employed to extend over the travelling hearth to direct the processed materials outwardly of the travelling hearth to some suitable receiver station located in close proximity thereto.

The operational concept described above has been successfully employed in the past for the production of coke from a carbonaceous material such as coal.

SUMMARY OF THE INVENTION

The main object of the invention is to utilize the excess heat energy and the reducing gases generated during a coking operation carried on in a substantially airtight chamber having a rotating or travelling hearth therein to produce a second product, namely, metallized ores, metallized pellets and/or sponge iron.

Another object of the invention is for the simultaneous production of coke and metallized ores where the charge of material to be deposited onto the rotating or travelling hearth comprises a mixture of iron oxide or other materials rich in metal oxides and coal or other carbonaceous material where the temperature of the furnace has been brought to a temperature above the ignition temperature of the volatiles evolved from the coal for providing an oxidizing atmosphere in the upper portion of the furnace to provide for a continued evolvement of volatiles from the materials undergoing treatment and to cause the evolving volatiles and carbon derived therefrom to reduce the oxides.

Another object of the invention is to provide a process for the simultaneous production of metallized ores and coke wherein the carbonaceous materials to produce the coke is first introduced onto a rotating or travelling hearth contained within a substantially airtight enclosure and to cause some of the volatiles from therein to evolve and to combust in the upper portion of the furnace and to thereafter introduce iron oxide or some other metal rich in oxides onto the hearth over the carbonaceous material to thus cause the evolved volatiles and carbon from the coal to act to reduce the oxides.

Another object of the invention is to provide for the simultaneous production of metallized ores and coke by feeding the metallic oxides in between a first and second layer of carbonaceous materials deposited onto a rotating hearth contained within a substantially airtight devolatilizing chamber to thus cause the evolved volatiles and carbon from the carbonaceous materials to reduce the oxides.

DESCRIPTION OF THE PREFERRED EMBODIMENTS

As stated previously, the process contemplated in the present invention makes use of a known process and apparatus, which is fully shown and described in prior U.S. Pat. Nos. 3,227,627 to Asquini, dated Jan. 4, 1966; Kemmerer et al, 3,475,286, dated Oct. 28, 1969; and U.S. Pat. application Ser. No. 22,118, filed Mar. 30, 1970, now U.S. Pat. No. 3,594,286, dated July 20, 1971 which Patents are incorporated herein by reference. The aforesaid Asquini Patent is directed generally to a process and apparatus for the continuous treatment of materials which yield oxidizable volatile matter under heat. In the Asquini Patent, a travelling hearth is provided within a substantially airtight enclosure and as volatiles are evolved from the materials undergoing treatment on the hearth, the same are caused to comingle with air admitted in the upper portion of the enclosure to thus combust to form an oxidizing atmosphere in that portion of the enclosure and the heat generated thereby will, while retaining a reducing atmosphere about the materials on the hearth, heat the roof and side walls of the enclosure and the materials on the hearth will be exposed to such heat to promote a futher removal of additional volatiles from within the materials and to combust these additional volatiles as described previously. As can be appreciated, once the enclosure has attained a given temperature gradient, and with sufficient volatiles evolved from the materials undergoing teatment on the hearth, the process can become autogenetic. However, in instances where the materials undergoing treatment on the hearth do not evolve sufficient volatiles to permit the process to be carried out on an autogenetic basis, gas and/or oil burners may be mounted in the roof and/or side walls of the enclosure to supply the required heat to properly process the materials on the hearth.

Kemmerer et al, U.S. Pat. No. 3,475,286, also incorporated herein by reference, discloses an apparatus for the continuous treatment of materials which evolve volatiles under heat and comprises an oven having a roof and side walls and a rotating hearth forming the floor of the oven. A central outlet is provided in the hearth for discharge of processed materials and rabbles are mounted in the roof of the oven for rabbling the materials on the hearth and also to direct the same to the aforesaid central outlet. As in the previously discussed Asquini Patent, the apparatus of the Kemmerer et al, Patent is fully capable of operating on an autogenetic basis in the treatment of materials therein with air being admitted into the upper portion of the oven to combust with volatiles evolved from the materials undergoing treatment. However, if the materials undergoing treatment do not yield sufficient volatiles to render the same autogenetic, oil and/or gas burner means may be mounted in the roof and/or side walls of the oven to supply the required additional heat to properly process the materials on the hearth.

U.S. Pat. No. 3,594,286, entitled Carbonizing Multiple Layers of Material by Maintaining Reducing Atmosphere in Bed and Oxidizing Atmosphere Above Bed, in the name of John L. Kemmerer, Jr., is directed generally to a continuous process for devolatilizing material containing volatiles wherein devolatilizable material is first fed as a layer onto an imperforate hearth housed within the lower portion of a devolatilizing zone and while in said zone, maintaining a reducing atmosphere around the materials being treated while simultaneously maintaining an oxidizing atmosphere in the upper portion only of the aforesaid devolatilizing zone to at least partially devolatilize the first layer and continuously feeding a second layer of materials onto said first layer to at least partially devolatilize the said second layer while continuing the devolatilization of the first layer.

Having briefly discussed the process and apparatus disclosed in the aforesaid Patents, your applicant herein now combines the advantageous results of both of these prior Patents and Patent Application and is thus able to process a charge comprising carbonaceous material and a metal oxide to simultaneously produce from the combined charge, a coke and a metallized ore. This can be accomplished in several different ways, utilizing the process and apparatus of the Patents discussed above.

It has been discovered that if oxide pellets or other feeds rich in metal oxides are charged along with coal or other carbonaceous material onto the rotating or travelling hearth of a furnace constructed in accordance with the teachings of the aforesaid Patents and Patent Application, the coal or other carbonaceous materials, when exposed to heat within the oven or furnace enclosure, gives off some of its volatiles which act to reduce the oxides in the oxide pellets or other feeds rich in metal oxides. As the combined charge, carbonaceous material and feeds rich in metal oxides continue in their progress from the entrance to the exit end of the furnace or oven, air is admitted into the upper portion of the furnace or oven so as to mingle with the gases evolving from the carbonaceous material and to thus form an oxidizing atmosphere in the upper portion of the furnace or oven while maintaining a reducing atmosphere about the materials undergoing treatment on the hearth.

Another manner of carrying out the process of the present invention is to first feed a charge of a carbonaceous material onto the travelling or rotating hearth. The carbonaceous material is subjected to a heat treatment to remove some of the volatiles from therewithin. Thereafter, a feed of materials rich in metal oxides is deposited onto the layer of carbonaceous materials already onto the hearth. This delayed admission of the metal oxides results in the prompt reducing treatment of the oxides. Consequently, and if desired, a second layer of carbonaceous materials may be deposited onto the already formed layers of carbonaceous materials and the materials rich in metal oxides. Of course, any number of alternate layers may be deposited on the hearth, always delaying the admission of the metallic oxides subsequent to the admission of the carbonaceous materials. The multiple feeding of the layers results in the continuous carrying out of the process in the furnace and the dual and conjoined formation of coke and metallized ores.

In the above described manner of depositing the layer of material rich in metal oxides onto the already formed layer of carbonaceous material, the layer of metal oxides can be introduced into the furnace or oven onto the rotating or travelling hearth therein at a point anywhere from the outer periphery of the hearth to the centrally located outlet therein, suffice to say that the metal oxides should be introduced into the oven or furnace at an area on the hearth which will enable the evolved gases from the carbonaceous materials to properly process the metal oxides.

The above sets forth several ways in which a carbonaceous material and metal oxides can be simultaneously processed within an enclosure as defined herein to produce both a coke and a metallized ores. The employment of the process and apparatus described above can equally be used to effect the production of these products by altering or modifying the manner of introducing the raw materials onto the rotating or travelling hearth of a furnace and still be within the purview of the invention, suffice to say that the crux of the invention is in the employment of a substantially airtight chamber having a rotary or travelling hearth therein and wherein volatiles evolving from a substance capable of evolving such volatiles under heat are employed for the production of metallized ores from feeds rich in metal oxides which are also fed onto the said hearth.

The process contemplated above may cause a complete burning of all of the evolved volatiles within the furnace or oven or in some instances only some of the evolved volatiles may be oxidized within the furnace. In cases where some of the evolved volatiles are not oxidized within the furnace or oven, the same may be directed to an after burner where the heat derived therefrom may be directed to the oxides being fed onto the rotating hearth to pre-heat the same. In instances where all or substantially all of the evolved volatiles are oxidized within the furnace or oven, the exhaust gases from the furnace or oven may be employed to pre-heat the oxides being fed to the furnace. Also, the heat derived from the above sources can likewise be effectively utlized to pre-heat the carbonaceous materials which are to be employed in carrying out the above defined process.

As can be appreciated, the process of treating materials as outlined above provides for an oxidizing atmosphere in the upper portion of a substantially airtight devolatilizing chamber while retaining a reducing atmosphere about the materials undergoing treatment on the hearth.

The speed of rotation of the rotary or travelling hearth can be readily regulated to meet the requirements of the materials undergoing treatment thereon to insure a proper processing thereof and as can be appreciated, the amount of carbonaceous materials with respect to the amount of oxides to be processed may be varied within wide limits depending upon the desired resultant products.

The resultant products obtained by the above described process may be cooled following their discharge from the furnace or oven and in instances where a fine coke is desired the combined resultant products are cooled together in a manner to promote the grinding of the coke. On the other hand, if large coke particles are desired, separation of the coke and metallized ores are accomplished in a manner to minimize degradation of the coke product.

The hearth previously referred to as forming the floor of the oven may be of circular formation and in some instances the hearth may be inclined downwardly towards a central material outlet. Also, if desired, the hearth may comprise a concentric step arrangement with rabbles mounted in the roof of the furnace to engage with the materials on the aforesaid stepped formation to cascade the materials downwardly thereon from one concentric step to the next lower step and eventually out through a central outlet formed in the lower portion of the hearth. In the case of a downwardly inclined hearth, rabbles, also roof mounted, may be employed for stirring the materials on the hearth and to eventually lead them to a centrally located material outlet.

While I have described a preferred embodiment of the invention and have presented a preferred method of practicing the same, it is to be understood that the invention is not limited thereto but may be otherwise variously embodied and practiced within the scope of the following claims.

I claim:

1. A process for the simultaneous production of coke and metallized ores within a substantially airtight devolatilizing chamber having a roof with air admitting ports therein, side walls and an imperforate travelling hearth forming the floor of the said chamber, comprising, first delivering a charge of carbonaceous materials onto the hearth to form a first layer thereon, subjecting said charge of carbonaceous materials to a heat treatment to effect a removal of volatiles from within said charge, then adding a charge of a metallic oxide onto the hearth to form a second layer, continuing to heat said charge of carbonaceous materials to evolve volatiles, said volatiles producing reaction gases, utilizing said reaction gases for the reduction of said charge of metallic oxides, admixing a further portion of said volatiles with air introduced into the upper portion of said chamber to provide an oxidizing atmosphere in that portion of the chamber while maintaining a reducing atmosphere above the layers undergoing treatment on said hearth.

2. The process defined in claim 1 wherein said roof is provided with an exhaust flue for the removal of gases emanating from said chamber for pre-heating the carbonaceous materials and the metal oxides prior to the delivery thereof to said hearth.

3. The process defined in claim 1 wherein burner means are mounted in the upper portion of the chamber to augment the heat generated within the said chamber.

4. The process defined in claim 1 wherein the heat developed within the devolatilizing chamber is derived solely by oxidation of the volatiles yielded by said carbonaceous materials.

5. The process defined in claim 1 wherein the heat developed within the devolatilizing chamber is derived by oxidation of all of the volatiles yielded by said carbonaceous materials.

6. The process defined in claim 1 wherein the heat developed within the devolatilizing chamber is derived by oxidation of substantially all of said volatiles yielded by said carbonaceous materials.

7. A process for the continuous and simultaneous production of coke and metallized ores within a substantially airtight chamber having a roof with air admitting ports therein, side walls and an imperforate travelling hearth forming the floor of said chamber, comprising, first delivering carbonaceous materials onto said hearth to form a first layer thereon, subjecting said carbonaceous materials to a heat treatment to remove some of the volatiles from therewithin, subsequently delivering materials rich in metal oxides onto said layer of carbonaceous materials on said hearth to form a second layer, continuing to heat said carbonaceous materials to evolve volatiles, said volatiles producing reaction gases for the reduction of said metallic oxides, admixing a further portion of said volatiles with air introduced into the upper portion of said chamber to provide an oxidizing atmosphere in that portion of the chamber while maintaining a reducing atmosphere above the layers undergoing treatment on said hearth, then cooling the resultant products and thereafter separating the coke from the metallized ores to thus obtain from the combined charge of materials two separate and distinct resultant products.

8. The process defined in claim 7 wherein said roof is provided with an exhaust flue for the removal of gases emanating from said chamber for pre-heating the carbonaceous materials and the metal oxides prior to the delivery thereof to the said hearth.

9. The process defined in claim 7 wherein burner means are mounted in the upper portion of the chamber to augment the heat generated within the said chamber.

10. The process defined in claim 7 wherein the heat developed within the chamber is derived solely by oxidation of the volatiles yielded by said carbonaceous materials.

11. The process defined in claim 7 wherein the heat developed within the chamber is derived by oxidation of all of the volatiles evolved from said carbonaceous materials.

* * * * *